United States Patent Office 2,857,318
Patented Oct. 21, 1958

2,857,318
PROCESS FOR PRODUCTION OF ERIODICTYOL

Robert M. Horowitz, Pasadena, Calif., assignor to the United States of America as represented by the Secretary of Agriculture No Drawing. Application May 6, 1957
Serial No. 657,459

5 Claims. (Cl. 195—32)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its prime object the provision of processes for isolating eriodictyol from source materials containing the same, particularly lemon products containing a mixture of naturally occurring flavonoids. Further objects and advantages of the invention will be evident from the following description.

Eriodictyol is a flavonoid having the structure 5,7,3',4'-tetrahydroxyflavanone and is a natural constituent of plant materials, particularly the lemon, occurring therein in its glycoside form. Next to hesperidin, eriodictyol is the principal flavonoid of lemons.

It has previously been reported that eriodictyol is present in citrus fruits and in many other plants including *Eriodictyon californicum, Lespedeza crytobotrya, Prunus campanulata, Prunus serrulata,* etc. Eriodictyol is a known component of the group of related flavonoid substances collectively designated as vitamin P and which are concerned with the maintenance of normal conditions in the walls of the small blood vessels. Deficiency in flavonoids is thought to cause increased capillary fragility and permeability. The eminent biochemist, Szent-Gyorgyi, has attributed the effectiveness of citrin, a vitamin P preparation made from lemons, to its content of eriodictyol. Various methods have been advocated for isolation of eriodictyol but none of them are of practical significance as the techniques are cumbersome and the yields are low.

It has now been found that eriodictyol may be isolated by a relatively simple and economical process wherein high yields of the desired material are obtained in pure form. As noted above, the starting material may be any substance containing eriodictyol although it is preferred to employ lemon products since they are especially rich in the desired compound. Particularly suitable raw materials are the products made from lemons which contain mixtures of naturally occurring flavonoid glycosides. Such preparations are currently manufactured by various concerns and are available on the open market.

The process of the invention is generally carried out in a sequence of steps involving, first, enzymatic hydrolysis and, second, extraction and purification.

In the first step, the raw material, which is generally a mixture of flavonoid glycosides including the glycoside of eriodictyol, is dissolved in water and the pH of the solution adjusted to the range of about 4 to 5, preferably 4.5. Naturally, if the starting material contains cellulose or other insoluble materials, these are filtered off and discarded. The adjustment in pH may be accomplished by adding a conventional acidifying agent such as acetic acid, hydrochloric acid, sulphuric acid, or other mineral acid. If desired the starting material may be dissolved in an aqueous buffer solution such as sodium acetate solution and the final adjustment of the pH of the solution then made as described. To this solution, however prepared, is then added an enzyme preparation capable of splitting glycoside linkages. Illustrative examples of such enzyme preparations are hemi-cellulase, emulsin, and mixtures of pectinesterase and polygalacturonase. The latter are commercial products primarily manufactured for use in clarifying fruit juices and the like. A typical product of this type is sold under the name "Pectinol." The added enzyme causes the flavonoid glycosides to be hydrolyzed to the corresponding aglycones. For example, eriodictyol glycoside is converted into eriodictyol. The enzymatic reaction is generally carried out for convenience at room temperature although it is possible to conduct the reaction in the temperature range (about 10 to 60° C.) as is generally permissible with enzyme-catalyzed reactions. The amount of enyzme to be added will vary depending on such factors as the purity of the enzyme used, the concentration of flavonoids in the crude starting material, etc. In any particular case the proper proportion can be readily determined by pilot experiments. In any event the enzymatic hydrolysis is continued for a sufficient period of time to convert all the flavonoid glycosides to the aglycone forms.

It may be noted that enzymatic hydrolysis is a critical step in the instant process; other hydrolytic procedures cannot be employed. For example, hydrolysis with mineral acid is inoperative because so many by-products, including tarry materials, are formed that it is impossible to isolate the eriodictyol from the hydrolysis mixture.

In the next step, the hydrolysis mixture is extracted to remove therefrom the flavonoid aglycones, including eriodictyol. This is conveniently accomplished by extracting the hydrolysis mixture with ethyl acetate. By-product sugars and other undesired materials remain in the aqueous phase. The ethyl acetate extract is then reduced to dryness by evaporation yielding a crystalline product consisting of a mixture of the flavonoid aglycones, including eriodictyol. Although ethyl acetate is the preferred solvent for the extraction, one may employ other essentially water-insoluble, volatile, inert solvents in which the flavonoid aglycones are soluble. Illustrative examples of such solvents are n-butanol, amyl alcohol, hexyl alcohol, propyl acetate, butyl acetate, amyl acetate, chloroform, etc.

In order to separate the eriodictyol from the other flavonoid aglycones in the dry product from the preceding step, the mixture is extracted with ether. Thereby the undesired flavonoids are extracted leaving as a residue eriodictyol. The residual eriodictyol may then be further purified by recrystallization from a suitable solvent such as aqueous alcohol.

The present invention, by providing a practical method of isolating eriodictyol, makes available this flavonoid to science and industry. Among its other uses, eriodictyol is valuable in experimental pharmacological areas for the systematic investigation of all the flavonoids, including eriodictyol, in order to compile scientific data on and correlate their biological activity, for example, on capillary fragility induced by such agencies as diets deficient in vitamin C, frostbite, radiation injury, histamine and anaphylactic shock, blood anticoagulants such as dicumarol, nutritional stresses such as water deficiency, and so forth.

In addition, eriodictyol may be used for the preparation of azo dyes and wood stains as disclosed in Patents Nos. 2,723,898 and 2,723,899. Eriodictyol can also be converted to luteolin in good yield; the latter compound is useful as a dyestuff.

Moreover, eriodictyol can be employed as an antioxidant for lard, cottonseed oil, butter oil, and other oxidation-susceptible fatty substances. In such use the eriodictyol is simply incorporated in the fatty material in a minor proportion (about 0.01 to 0.1%).

The invention is further illustrated by the following example.

*Example*

The starting material used was a mixture of lemon flavonoids obtained from lemon peel by a process involving precipitation with calcium. Included in this mixture were hesperidin, eriodictyol glycoside, diosmin, and other unidentified flavonoid glycosides. The material was a commercial product manufactured by the Sunkist Growers under the name "Calcium Flavonate Glycoside, Lemon."

Two hundred grams of the above material was mixed with 3.6 liters of 0.1 M aqueous sodium acetate buffer (pH 4.6). The mixture was warmed to about 50° C. then cooled and filtered. The clear solution was adjusted to pH 4.5–4.6 by addition of acetic acid.

To the solution was then added 10 grams of hemicellulase and the mixture allowed to stand for 3 days at room temperature. The reaction mixture was then extracted with three 500 cc. portions of ethyl acetate, the resulting extract being filtered and reduced to dryness. It was found that the crystalline product so produced consisted chiefly of eriodictyol. To further purify this material it was extracted with 200 cc. of boiling ether for 1 hour to remove minor flavonoid impurities. The purified solid material was then recrystallized from dilute aqueous alcohol. Five grams of pure crystalline eriodictyol of melting point 268° C. was thus obtained.

In other runs, the 200 grams of starting material was mixed with 3.6 liters of water, the pH adjusted to 4.5–4.6 with acetic acid or dilute mineral acid, warmed to 50° C. and filtered. The clear solution was treated as above described and eriodictyol was obtained in essentially the same yields.

Having thus described my invention, I claim:

1. A process for isolating eriodictyol from source materials containing the same in glycoside form which comprises subjecting the source material, in aqueous solution at a pH from about 4 to about 5, to contact with a flavonoid glycoside-splitting enzyme whereby flavonoid glycosides in the source material are converted into flavonoid aglycones, and thereafter extracting eriodictyol from the solution.

2. A process for isolating eriodictyol from source materials containing the same in glycoside form which comprises subjecting the source material, in aqueous solution at a pH from about 4 to about 5, to contact with a flavonoid glycoside-splitting enzyme whereby flavonoid glycosides in the source material are converted into flavonoid aglycones, extracting the solution with a volatile, inert, essentially water-insoluble solvent in which flavonoids are soluble to obtain a solution of flavonoids, including eriodictyol, reducing the solution to dryness and extracting the residue with ether whereby to remove undesired flavonoids leaving a residue of essentially pure eriodictyol.

3. The process of claim 2 wherein the enzyme is hemicellulase.

4. The process of claim 2 wherein the solvent is ethyl acetate.

5. The process of claim 2 wherein the source material is a mixture of flavonoid glycosides obtained from lemon.

References Cited in the file of this patent

UNITED STATES PATENTS

| | | |
|---|---|---|
| 2,069,687 | Stoll et al. | Feb. 2, 1937 |
| 2,370,961 | Hollander | Mar. 6, 1945 |
| 2,700,047 | Wilson | Jan. 18, 1955 |

OTHER REFERENCES

"Science," vol. 96, No. 2491, Sept. 25, 1942, pp. 302 and 303.